(12) United States Patent
Pujar et al.

(10) Patent No.: US 7,979,310 B2
(45) Date of Patent: Jul. 12, 2011

(54) METHODS AND SYSTEMS FOR CONSOLIDATING PURCHASE ORDERS

(75) Inventors: Aparna Pujar, San Jose, CA (US); Chalapathi Rao, Fremont, CA (US)

(73) Assignee: Omnicell, Inc., Palo Alto, CA (US)

( * ) Notice: Subject to any disclaimer, the term of this patent is extended or adjusted under 35 U.S.C. 154(b) by 95 days.

(21) Appl. No.: 11/195,221

(22) Filed: Aug. 1, 2005

(65) Prior Publication Data
US 2006/0036507 A1 Feb. 16, 2006

Related U.S. Application Data

(62) Division of application No. 10/095,849, filed on Mar. 11, 2002.

(51) Int. Cl.
*G06Q 30/00* (2006.01)
(52) U.S. Cl. ............... 705/26; 705/28; 705/30; 705/37
(58) Field of Classification Search .............. 705/26, 705/28, 30, 37; 345/810
See application file for complete search history.

(56) References Cited

U.S. PATENT DOCUMENTS

| | | | | |
|---|---|---|---|---|
| 5,715,314 A * | 2/1998 | Payne et al. | ...................... | 705/78 |
| 5,758,329 A * | 5/1998 | Wojcik et al. | .................. | 705/28 |
| 6,151,582 A * | 11/2000 | Huang et al. | ...................... | 705/8 |
| 6,260,024 B1 * | 7/2001 | Shkedy | ........................... | 705/37 |
| 6,466,919 B1 * | 10/2002 | Walker et al. | ................... | 705/37 |
| 6,970,838 B1 * | 11/2005 | Kamath et al. | ................... | 705/26 |
| 7,035,816 B2 * | 4/2006 | Jankelewitz | .................... | 705/26 |
| 7,124,107 B1 * | 10/2006 | Pishevar et al. | ................. | 705/37 |
| 7,181,419 B1 * | 2/2007 | Mesaros | ......................... | 705/26 |
| 7,212,976 B2 * | 5/2007 | Scheer | ............................ | 705/1 |
| 7,386,478 B2 * | 6/2008 | Viswanath | ..................... | 705/26 |
| 2002/0007321 A1 * | 1/2002 | Burton | ........................... | 705/26 |
| 2002/0016759 A1 * | 2/2002 | Macready et al. | ............. | 705/37 |
| 2002/0152140 A1 * | 10/2002 | Kondo et al. | ................... | 705/28 |
| 2002/0169679 A1 * | 11/2002 | Neumayer | ...................... | 705/26 |
| 2002/0186254 A1 * | 12/2002 | Monbaron | ..................... | 345/810 |
| 2005/0027611 A1 * | 2/2005 | Wharton | ........................ | 705/26 |

* cited by examiner

*Primary Examiner* — F. Ryan Zeender
*Assistant Examiner* — Luna Champagne
(74) *Attorney, Agent, or Firm* — Kilpatrick Townsend & Stockton LLP

(57) ABSTRACT

A method is provided for electronically ordering items. The method includes receiving consolidation information at a server computer. The consolidation information includes at least one consolidation criterion for determining how to consolidate purchase requests. The method further includes receiving a plurality of requests to purchase one or more items at the server computer and evaluating the requests, using the consolidation criterion. A purchase order, containing the items meeting the consolidation criteria, is transmitted from the server computer to a supplier a purchase order containing the items meeting the consolidation criterion.

15 Claims, 7 Drawing Sheets

Requisitioning | Search Catalog | Favorite Items | Special Request | Checkout

RequisitioN Checkout: attachments justification approval preview

[Close] [Update Total] [Delete All] [Print]

TemplateID: 16025 CARDIAC RECOVERY/OPEN HEAR REQ DIRECT ▼

☐ StatOrder ☐ byPass Dispatch [Submit]

| Line # | Quantity | Max. Quantity | Unit | Item | Actions | Manufacturer | Supplier | Supplier Part Number | Buyer Part Number | Global Part Number | Global Vendor Number | Local Vendor Number | Unit Price (USD) |
|---|---|---|---|---|---|---|---|---|---|---|---|---|---|
| 1 | 0 | 0 | EA | MARKER, MAGIC BLK | ✂⊘☐☐ | SANDFORD | STOREROOM STOR | N215001 (EVAMAR_704740000) | 704740000 | 1764671 | 180890 | STOR | $1.02 |
| 2 | 0 | 0 | EA | POT,COFFEE DECAFE 12 CUP ORANGE HANDLE | ✂⊘☐☐ | INSTITUTIONAL DIST. | INSTITUTIONAL DISTRIBUTORS INC. | 784948 (EVAMAR_872586700) | 872586700 | 1752818 | 177361 | 51931 | $3.02 |
| 3 | 0 | 0 | EA | FAN, 6" PERSONAL 2-SPEED | ✂⊘☐☐ | DAYTON | GRAINGER W W INC. | 4C796 (EVAMAR_876434950) | 876434950 | 1796609 | 174213 | 45380 | $11.72 |
| 4 | 0 | 0 | BX | CHART PAPER, LIFEPAX 9&P, SRJB_804700-003 | ✂⊘☐☐ | MEDTRONIC PHYSIO | OWERS & MINOR (SM) | 509404700003 (EVAMAR_877252955) | 877252955 | 1796771 | | 30500 | $17.02 |
| 5 | 0 | 0 | BX | GLOVE SURGEON, BIGGEL POWD-ER_S27,50_30875 | ✂⊘☐☐ | REGENT MED. | ALLEGIANCE HEALTHCARE (SM) | ACP20075 (EVAMAR_077414500) | 877414500 | 1770113 | 174093 | 23307 | $135.13 |

Requisition Name: Omnitech600-11096

Create Date: March 4, 2002 | Line Item Count: 21 | Total (USD): $0.00

Internet zone

METHODS AND SYSTEMS FOR CONSOLIDATING PURCHASE ORDERS

BACKGROUND OF THE INVENTION

This invention relates generally to the field of inventories, and in particular to the replenishment of depleted inventories. More specifically, the invention relates to methods and systems for consolidating items into purchase orders based on specified criteria. The invention also relates to techniques for compiling information about purchase orders to enable analysis of purchasing practices.

Many organizations handle purchasing on a departmental level, using separate purchase orders for individual items or small groups of items. However, when purchasing is handled at the departmental level using separate purchase orders, a large organization may fail to realize efficiencies available when purchasing in an organized manner.

For example, in the hospital environment, several departments may generate multiple requests for bandages, all from the same vendor on the same day. Since vendors often ship each order separately, such ordering practices may result in the hospital receiving several shipments from the same vendor, each having its own shipping charge.

Another issue confronting geographically diverse organizations is that some have had difficulty tracking and analyzing their purchasing practices. For example, each site may maintain its own ordering system. As such, an organization-wide purchasing analysis may be difficult to produce.

Hence, this invention relates to systems and techniques for improving purchasing practices.

BRIEF SUMMARY OF THE INVENTION

In certain aspects, the invention provides methods and systems for consolidating ordered items into one or more purchase orders. The invention also provides methods and systems for facilitating the analysis of an organization's purchasing practices.

In one embodiment, a method is provided for electronically ordering items and consolidating the purchase requests into purchase orders based on certain consolidation criteria. The method may conveniently utilize a computer system that receives consolidation information over a computer network. The consolidation information includes at least one consolidation criterion for determining how to consolidate purchase requests. As requests to purchase one or more items are received at the computer system, they are evaluated using the consolidation criterion. Once the consolidation criterion is met, a purchase order may be generated by the computer system and transmitted to a supplier for fulfillment. If the items are requested from more than one supplier, the consolidation process may also segregate the purchase orders based on the suppliers.

The transmission of the purchase order may be accomplished using a variety of techniques. For example, the purchase order may be sent by facsimile transmission, by electronic mail, by use of the Internet or other network, by an electronic data interchange (EDI), by traditional or express mail, or the like. Further, various interfaces may be used to facilitate such transmissions.

The method may utilize a wide variety of consolidation criteria. For instance, the consolidation criteria may specify that consolidation of one or more requested items should occur every hour, every day, at a specified time of day, on specified days of the week, on specified dates, or the like. As further examples, the consolidation criteria may specify that consolidation should occur after a specified number of line items for a given supplier has been reached, or when the ordered items for a given supplier have met a specified monetary threshold. One consolidation criterion may specify that a purchase order should contain less than a specified maximum number of line items. As further examples, the criteria may require that a purchase order be consolidated based on different ship-to locations or based on cost centers. Further, various criterion may be used in combination. For example, one criterion may be that the requested items be consolidated into a purchase order every Monday, while another criterion requires that the requested items by consolidated based on shipping locations. As such, on Monday, two purchase orders may be generated and sent to a supplier, with each purchase order having a different shipping location. Hierarchical workflow rules may be provided to dictate the order when applying multiple criteria.

In another aspect of the invention, the computer system may transmit an approval request to a supervisor computer. If approved by the supervisor, approval information is received back at the computer system. In this way, the computer system may be configured to transmit the purchase order to the supplier only if the computer system receives an approval.

The invention also provides a method for providing purchase order consolidation information to a server computer. According to this method, a requester computer receives a form having data fields for entering consolidation information. Conveniently, the form may be transmitted from a server computer over a network, and the requester computer may include a web browser to display the form. Consolidation information is entered into one or more of the data fields, and the form is transmitted back to the server computer and stored. The consolidation information may then be used to automatically consolidate purchase requisitions as previously described.

Another embodiment of the invention provides a system for electronically ordering items. The system comprises a server computer that is configured to receive consolidation information, including one or more consolidation criteria. Conveniently, the server computer may have an associated database for storing the consolidation criteria. The server computer is also configured to receive and store multiple requests to purchase one or more items. As the requests are received, the system is configured to evaluate the purchase requests using the consolidation criterion. If a given criterion is met, the computer system produces a consolidated purchase order containing those items meeting the criterion. If needed, the items meeting the criteria may be segregated into separate purchase orders based on the supplier.

The server computer and the database may be separate pieces of hardware, or may be integrated together. Further, in some cases, the database may include work flow rules to evaluate the purchase requests to determine if a consolidation criterion is met. The database may also contain lists of suppliers, items, prices, ship-to locations, cost centers and the like that may be accessed by a user when generating a purchase request. In another aspect, the database may be configured to keep a record of all requisitions and purchase orders for future reference.

In a further aspect, the computer system may be configured to transmit an approval request to a supervisor computer, to receive approval information back from the supervisor and to transmit the purchase order only if the approval information is affirmative. To transmit the purchase order, the system may use a variety of interfaces that are in communication with the server computer and/or the database. For example, interfaces may be used to transmit orders by an EDI, by facsimile, by e-mail, by traditional mail, or the like. In other aspects, the system may also comprise a supplier computer having a computer readable medium with instructions for receiving and fulfilling a transmitted purchase order.

BRIEF DESCRIPTION OF THE DRAWINGS

FIG. 3B is a depiction of a computer display, in accordance with one embodiment of the invention, illustrating the creation of a requisition by template.

FIG. 5 is a depiction of a computer display showing consolidation criteria in accordance with one embodiment of the invention.

DETAILED DESCRIPTION OF THE INVENTION

Figure 1:
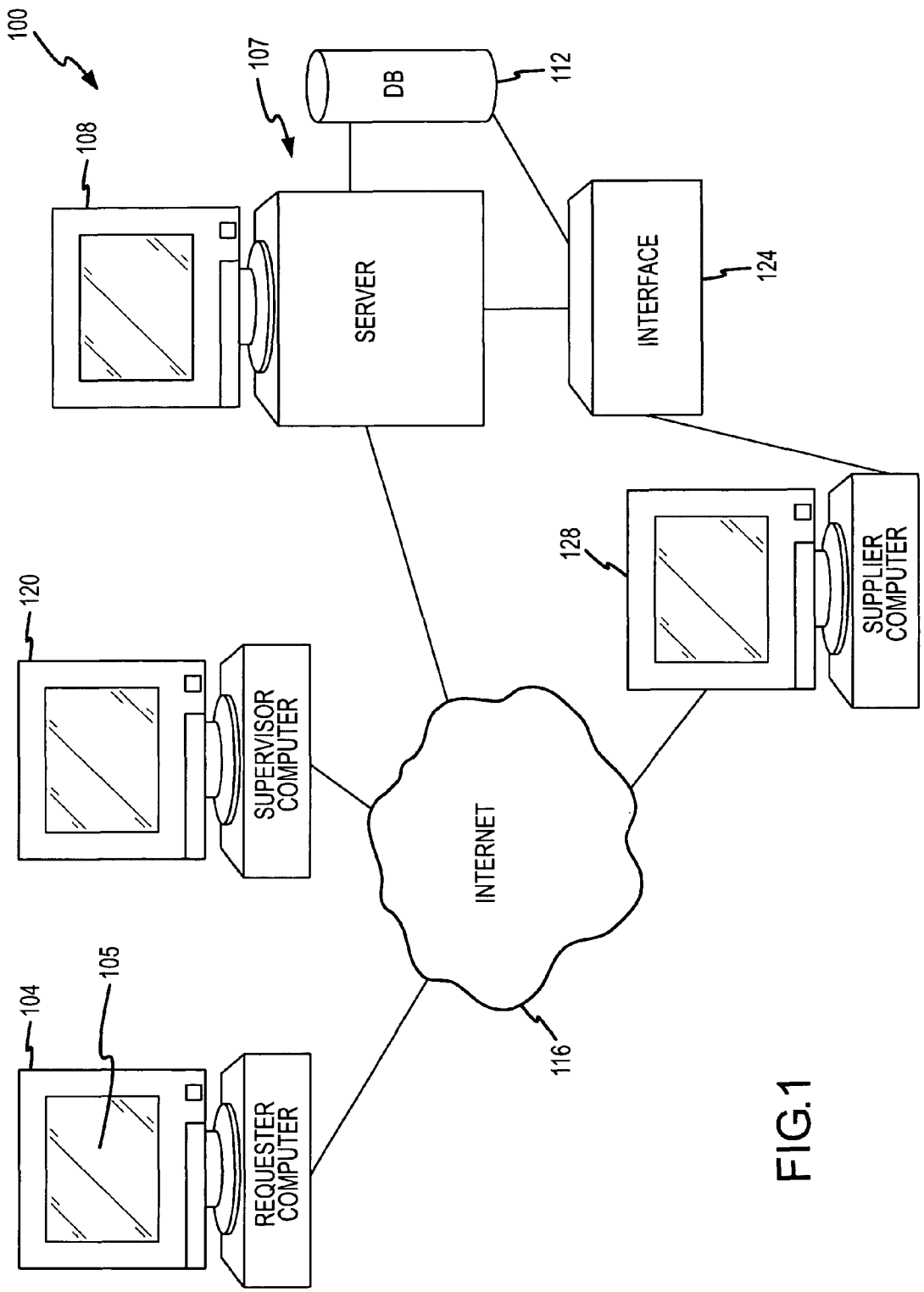
FIG. 1 is a schematic diagram illustrating one embodiment of the present invention.

The invention provides for the automatic consolidation of purchase requests into one or more purchase orders based upon one or more workflow or consolidation rules. Conveniently, the workflow rules may be specified, at least in part, by the purchaser. Once consolidated, the invention automatically transmits the purchase orders.

The purchase requests may be received at a computer system that is configured to store and process the requests based on the consolidation rules. The purchase requests may be received over a computer network, such as the Internet, a local area network, a wide area network, a wireless network or the like. The computer system may therefore include an interface that couples the computer system to the network. Further, the computer system may include one or more processors, memory and/or associated databases that are employed to store and process the purchase requests according to the consolidation rules. Once purchase orders are generated, the computer system may transmit the purchase order to a supplier to fulfill the order. To do so, the computer system may utilize one or more interfaces to transmit the purchase order in a format requested by the supplier. For example, the purchase orders may be transmitted via a computer network, such as by an e-mail, by an EDI, by facsimile, by phone, by mail, and the like.

The consolidation rules or criteria may also be transmitted over the network and stored by the computer system. Conveniently, the computer system may be configured to transmit a form to a purchaser computer where the criteria may be input and transmitted back to the computer system.

The purchase requests received at the computer system may contain the name of one or more items to be purchased from one or more suppliers. The requests may also designate one or more cost centers that are to be charged along with one or more shipping locations. Conveniently, the purchase requests may be organized into "line items" that each contain information on a requested item and stored in a relational database. As the requests are received, each line item is processed according to the consolidation rules and information regarding the analysis is generated and stored. Once a given criteria is satisfied, a purchase order is automatically generated by the computer system and includes all line items from any of the purchase requests that meet the criterion based on the stored analysis.

For example, one consolidation criteria may be to consolidate all purchase requests into a purchase order on a specified day. Hence, as the purchase requests are received, each line item is analyzed to determine its date and time of receipt and is assigned a consolidation date. Upon occurrence of the specified date, every line items with the assigned consolidation date is consolidated into a purchase order. Also, these items may be segregated by supplier so that a separate purchase order is generated for each supplier.

The consolidation rules may also permit consolidation based on multiple criteria. For example, one criterion may be a minimum number of line items for a given supplier purchase order and another criterion may be a consolidation based on ship locations. Hence, once the minimum number of line items is reached, purchase orders are generated based on shipping locations such that each purchase order is to a given supplier along with a request to ship to a given location. Further, hierarchical rules may be developed to determine the order in which multiple criteria are applied.

FIG. 1 illustrates a system 100 for consolidating purchase orders in accordance with one embodiment of the invention. System 100 comprises one or more requester computers 104 (with only one being illustrated for convenience of illustration) that are used by purchasers when electronically requesting items for purchase, as well as when entering consolidation and other information needed to complete the transaction. System 100 further includes a computer system 107 that communicates with requester computers 104 over a network, such as the Internet 116, although other networks may be used as well. Computer system 107 comprises a server computer 108 and an associated database 112. Computer system 100 may also further include one or more servers 124 having interfaces (with only one being shown for convenience of illustration) to permit purchase orders to be transmitted to a supplier as described hereinafter.

Conveniently, server computer 108 may be configured to transmit and receive web documents over Internet 116. Similarly, requester computer 104 may be include a web browser and other software to permit web documents to be displayed on a display screen 105. As is known in the art, computer 104 may also include one or more entry devices to permit information to be entered into computer 104. Further, computer 104 may include appropriate hardware and software to transmit entered information to computer system 107. Server computer 107 may comprise a Windows NT Server, Windows 2000, Advanced, Enterprise, or Datacenter Server computer, commercially available from Compaq computer. As described hereinafter, server computer 108 includes application software to assist purchasers in selecting items for purchase and in completing the transaction. Database 112 may store a list of items available for purchase, their associated suppliers, associated manufacturers, commodity classifications and taxonomy based on UNSPSC classification or any custom classification scheme, contract price or list price for the item, a smart-form to capture item specific information such as Consignment Information for Implants and the like. This information may be updated by the suppliers by simply transmitting a document file over the internet to server computer 124 and entered into database 112 by batch processing jobs. Database 112 may comprise a MS SQL Server or Oracle database, commercially available from Microsoft Corporation or Oracle Corporation, and may also includes a set of consolidation rules for consolidating purchase orders as described hereinafter. Further, although computer system 107 is shown as having separate components, it will be appreciated that a single computer unit may be used, as well as other types of modular systems as is known in the art.

Server 108 may also be in communication with a supervisor computer 120 (which could also function as a requestor computer). Such communication may be over the Internet 116 or other type of network. As described hereinafter, supervisor computer 120 may receive a request to authorize a purchase order request received at computer system 107.

A variety of techniques may be used to transmit purchase orders from computer system 107 to a supplier. For example, if the supplier has a supplier computer 128 that is coupled to Internet 116, purchase orders may be sent from server computer 108 to supplier computer 128 over the Internet 116 as is known in the art. For instance, the purchase order may be in the form of an e-mail. For other types of communications, interface 124 may be employed. For example, interface 124 may be configured to send a facsimile of a purchase order to a supplier, or to generate a paper invoice that may be mailed to the supplier. Alternatively, interface 124 may comprise an Enterprise Application Interface (EAI) that converts an Extensible Markup Language (XML) file of the purchase order to an EDI file and transmits the purchase order as an EDI file to the supplier computer 128.

Figure 2:
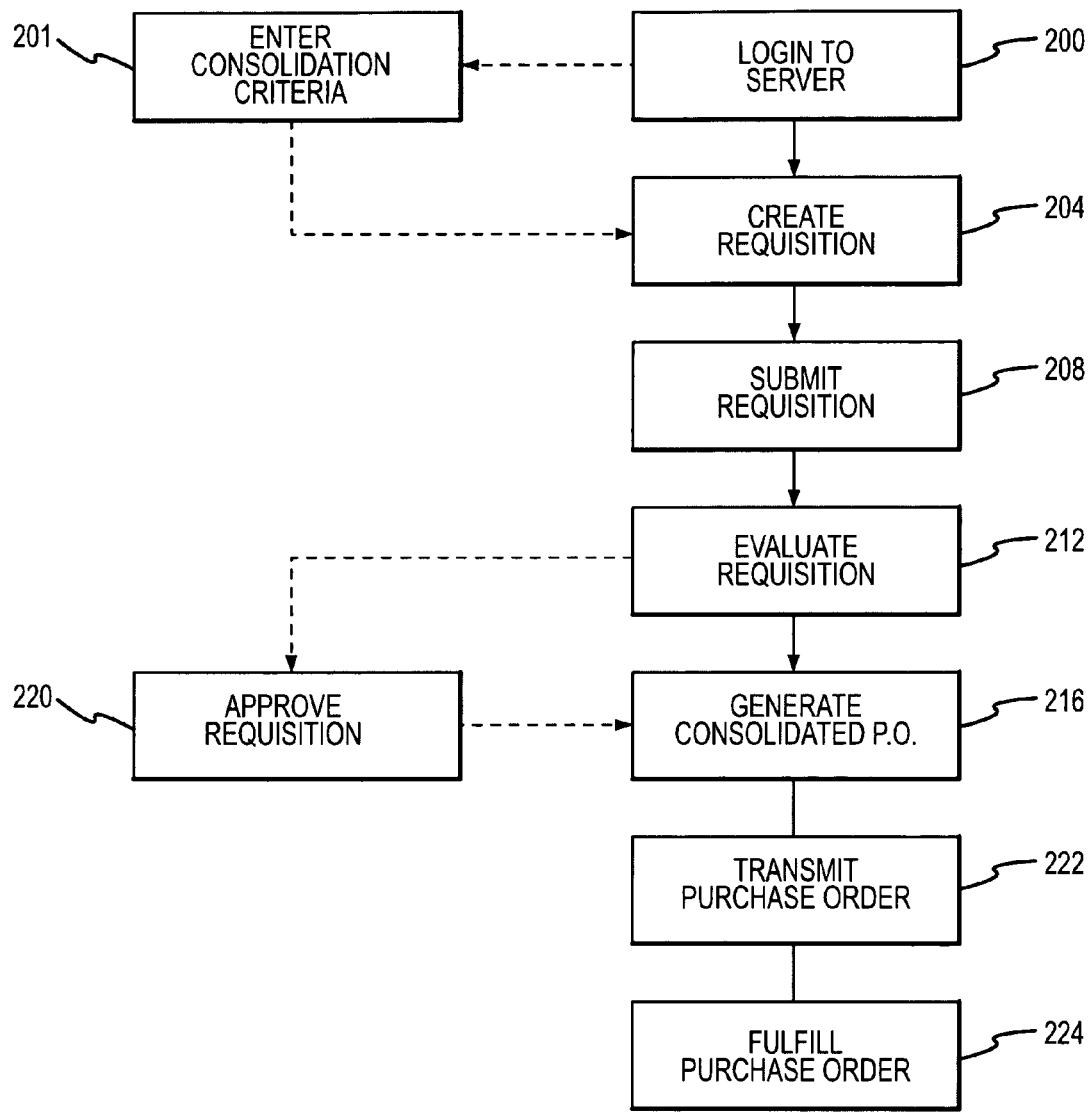
FIG. 2 is a flow diagram illustrating the creation and consolidation of purchase orders according to one embodiment of the present invention.
Figure 3A:
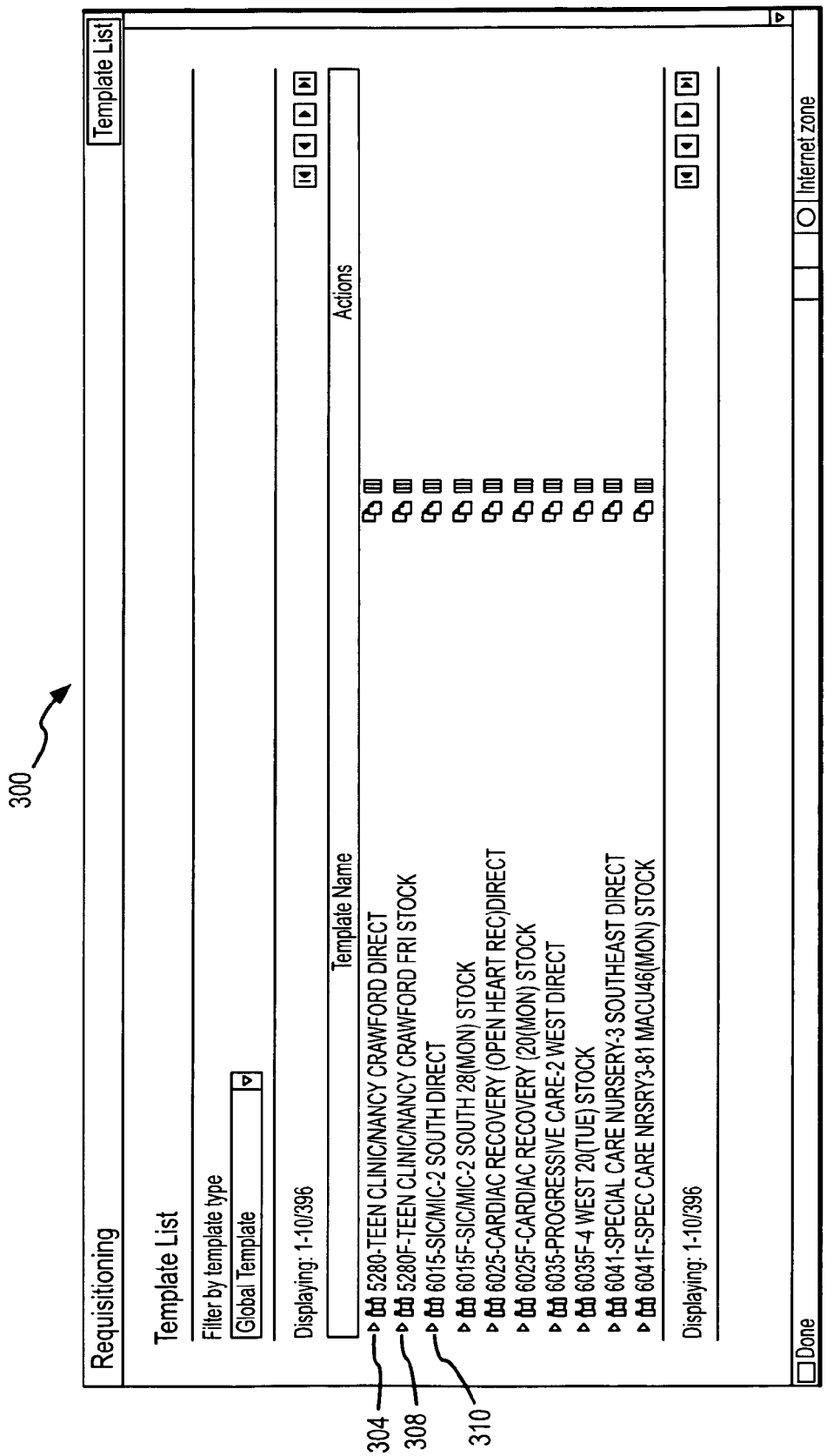
FIG. 3A is a depiction of a computer display, in accordance with one embodiment of the invention, allowing a user to choose a template to create a requisition.

FIG. 2 is a flow diagram illustrating one method for purchasing items that have been consolidated based on certain criteria. For convenience of discussion, the method of FIG. 2 will be described in connection with the system of FIG. 1, although it will be appreciated that other systems may be used to implement the method. Initially, a user uses requester computer 104 to log in to server 108 at block 200. After logging in, the user may optionally enter consolidation criteria at block 201 that is transmitted back to computer system 107. Step 201 may be part of a purchasing session, or may be done at another time. The entering of consolidation criteria will be described in greater detail hereinafter with reference to FIG. 5. To begin the requisition process, the user may create a requisition at block 204. Such a requisition may be any request to purchase one or more items or services from one or more suppliers. Such requisitions may be created in a variety of ways. For example, as shown in FIG. 3A, a requisition may be created from a template that may be transmitted from server computer 108 to requester computer 104 and displayed on display screen 105. FIG. 3A illustrates a template list screen 300 permits the user to choose among multiple pre-configured templates (304, 308, 310), each having a number of pre-specified items to be purchased. These templates may have been previously defined and created from a requester computer and then stored in computer system 107. In this way, some or all of the information needed to complete the transaction may be stored in a template and then modified by the user when ready to make a purchase.

For instance, after the user selects a requisition template (such as by using a mouse at computer 104), a detail screen 314 is rendered on display 105 as shown in FIG. 3B. Display screen 314 is rendered based on information transmitted from server computer 108. Detail screen 314 includes a number of pre-specified line items 318, 320, 324. Each line item may contain information such as the item quantity, a maximum quantity, the unit, the name of the item, any actions, the manufacturer, the supplier, the supplier part number, the buyer part number, the global part number, the local vendor number, and unit price, and the like. As shown, the user may select a desired quantity of each of the pre-configured line items in the template simply by entering a desired quantity. Alternatively, the template may contain pre-specified quantities of items.

By selecting a button 328, the user can determine the total price 332 of all of the items listed on screen 314. As is known in the art, the user may scroll down screen 314 to review all items in the order. In some embodiments, each requisition may have a pre-configured maximum dollar threshold or a pre-configured maximum quantity for a particular item. In addition, while this illustrative aspect displays a supplier for each line item 318, 320, 324, other embodiments may allow the user to choose among different suppliers or, alternatively, may not show any supplier information at all. Once the appropriate information has been entered for all the line items, a submit button 325 may be selected to formally request purchase of the items.

Figure 3C:
FIG. 3C is a depiction of a computer display in accordance with one embodiment of the invention, illustrating the creation of a requisition by browsing a catalog.

In another aspect, the user may select items to be purchased by searching or browsing an item catalog. Conveniently, a search catalog tab 327 on screen 314 may be selected to produce a browse catalog screen 336 as shown in FIG. 3C. Screen 336 allows the user either to search for items (for example, by entering a key word into a field 340, by entering a manufacturer in a field 344, by entering a part number into a field 348 and/or by entering a supplier into a field 352) or to browse the catalog by a specified category using a browse catalog icon 356. After the user has entered the search criteria or chosen the commodity grouping or category, the request is transmitted to server computer 108 for processing. Conveniently, the catalog of items may be stored in database 112 and accessed by server computer 108. Once processed, a document is sent back illustrating line items 360, 364 that match the search or browse criteria and displayed on display screen 105. As discussed above, the user may then enter a quantity desired for each of the chosen items.

Although not shown, the user may specify or choose an item and request a list of all items in the catalog that are similar to or compatible with the selected item. In addition to the exemplary aspects described above, those skilled in the are will recognize that other methods of selecting items for purchase can be used without varying from the scope of the present invention; for instance, server 108 might provide links to catalogs stored in other locations, for instance on supplier computer 128.

Referring back now to FIG. 2, after the user has chosen the items, the user submits the requisition to server 108 at block 208. After the requisitions have been submitted, computer system 107 evaluates the requisitions at block 212 according to the consolidation criteria stored within computer system 107. When a consolidation criterion is satisfied, one or more consolidated purchase orders are generated at block 216. Optionally, as shown in block 220, requisitions may need to be approved by a supervisor using supervisor computer 120 before they can be consolidated. In such cases, computer system 107 sends information to supervisor computer 120 asking whether the request is approved. Once an affirmative response is received back at computer system 107, the requisition may proceed to consolidation once the specified consolidation criterion is satisfied.

Figure 5:
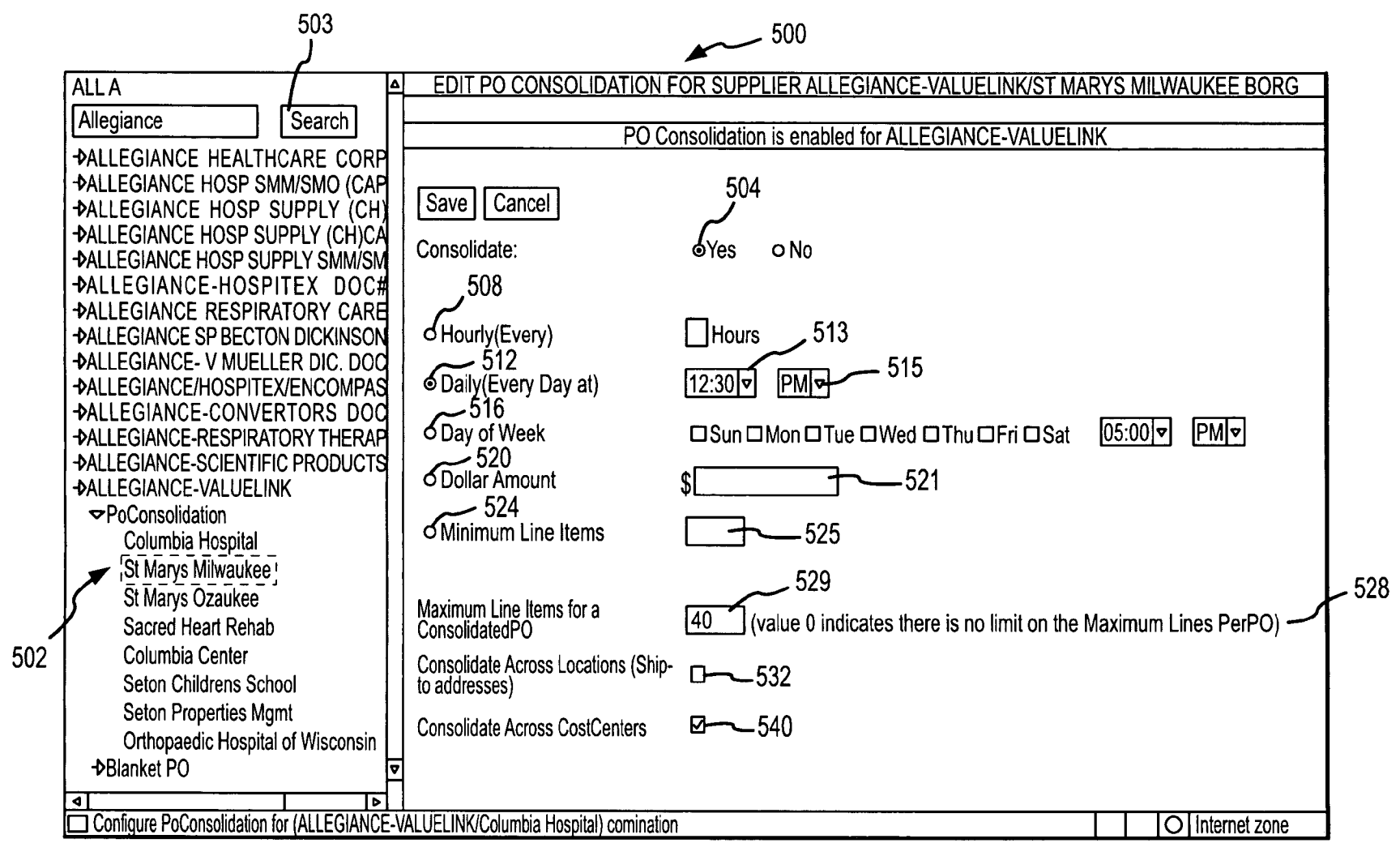

Referring to FIG. 5, one way for providing the consolidation information to computer system 107 will be described. FIG. 5 illustrates an item consolidation screen 500 that may be displayed on display screen 105 based on a document transmitted from computer system 107. To locate the purchasing entity to which the consolidation criterion is to be applied, the user may scroll down a list 502 of previously entered purchasing entities, or use a search button 503. The user may then select the desired purchasing entity and start the process for assigning consolidation criteria. By selecting a button 504, a user may select whether consolidation should occur. If so, the user may further indicate the criteria for consolidation. For example, FIG. 5 illustrates various consolidation options for the purchaser to select. Although shown with certain options, it will be appreciated that the invention is not intended to be limited to only these options. Further, the system may be configured such that the purchaser may only select a single option or multiple options in combination.

One option is an hourly option 508. In this option, the user designates an hour interval which must pass before consolidation. For example, if a four hour interval is selected, line items that are received within a given four hour interval are flagged and then consolidated by supplier at the end of the four hour interval.

Option 512 is a daily option where purchase requests are consolidated into purchase orders every day. Further, drop down menus 513 and 515 may be used to specify a certain time of day upon which consolidation will occur. Hence, as purchase orders are received, each line item is flagged with the date of consolidation. Upon occurrence of the designated time each day, the flagged items are consolidated. For instance, if a request is received at 10:00 a.m. on a Monday, and the consolidation time is 1:00 p.m., all line items on the request will be consolidated into purchase orders based on their suppliers at 1:00 p.m.

Option 516 is a day of the week option where purchase requests are consolidated on a specified day of the week. For instance, the user may mark one of the days listed on screen 500 to select that particular day. Further, the user may also select a particular time of the selected day for consolidation to occur. Optionally, the user may also select multiple days during the week when consolidation should occur, e.g., on Tuesdays and Thursdays.

Option 520 is a dollar amount option where consolidation occurs once line items from one or more requests reaches a threshold dollar amount. Conveniently, the dollar amount may be entered into a field 521. As purchase requests are received at computer system 107, each line item is evaluated for its dollar amount and a running total is maintained. Once the threshold dollar amount is reached, consolidation by supplier occurs.

Option 524 is a minimum line item option where consolidation occurs once a minimum number of line items is reached. Conveniently, the number of line items may be entered into a field 525. As purchase requests are received at computer system 107, a running total of each line item is maintained. Once the threshold line item number is reached, purchase orders are generated based on the appropriate supplier.

Option 528 is similar that that of option 524 but instead consolidates based on a maximum number of line items. For example, shown in field 529 is an entry of 40 line items. In this way, if a purchase request includes 100 line items, it is immediately consolidated into multiple purchase orders that are less than 40 line items per supplier. This number may be increased, for example, to a 200 line item maximum so that a purchase order may include up to 200 items.

Option 532 is a shipping address consolidation option that consolidates purchase orders based on shipping locations. Hence, if this option is selected, each line item of a purchase request is evaluated by computer system 107 to determine the desired shipping location. If more than one shipping location is determined, the line items are consolidated into multiple purchase orders based on the supplier of the items and the shipping location of the items.

Option 540 is a cost center consolidation option that consolidates purchase orders based on cost centers of the organization requisitioning the items. Hence, if this option is selected, each line item of a purchase request is evaluated by computer system 107 to determine the indicated cost center. If more than one cost center is determined, the line items are consolidated into multiple purchase orders based on the supplier of the items and the cost centers. In this way, each cost center has its own separate purchase orders.

In some cases, the various consolidation criteria may be selected in combination. For instance, the user may choose to consolidate items only on Tuesdays and only when the total price for the consolidated items cost is more $100. Alternatively, the user could choose to consolidate items every Tuesday, and also every time $100 worth of items have been requisitioned. Such a feature may be implemented by using common operators, such as "and", "and/or" or "or" operators that are selected by the user if multiple criteria are selected.

With such a configuration, items may be ordered from many different requester computers 104 in diverse locations, yet all purchasing can be done centrally to allow for easier analysis of purchasing practices and realization of economies of scale. In addition, if desired, a consistent purchasing policy may be enforced, since all purchasing can be routed through a central computer system.

In certain embodiments, consolidation criteria may be set for each supplier or for each location or cost center of the user's organization. For example, each cost center may be assigned its own set of consolidation criteria. Those skilled in the art, however, will see that in other embodiments, one set of consolidation criteria may be used for all suppliers or for all locations or cost centers the organization, without varying from the scope of the invention. In still other embodiments, users may choose consolidation criteria on a requisition-by-requisition basis.

Figure 4:
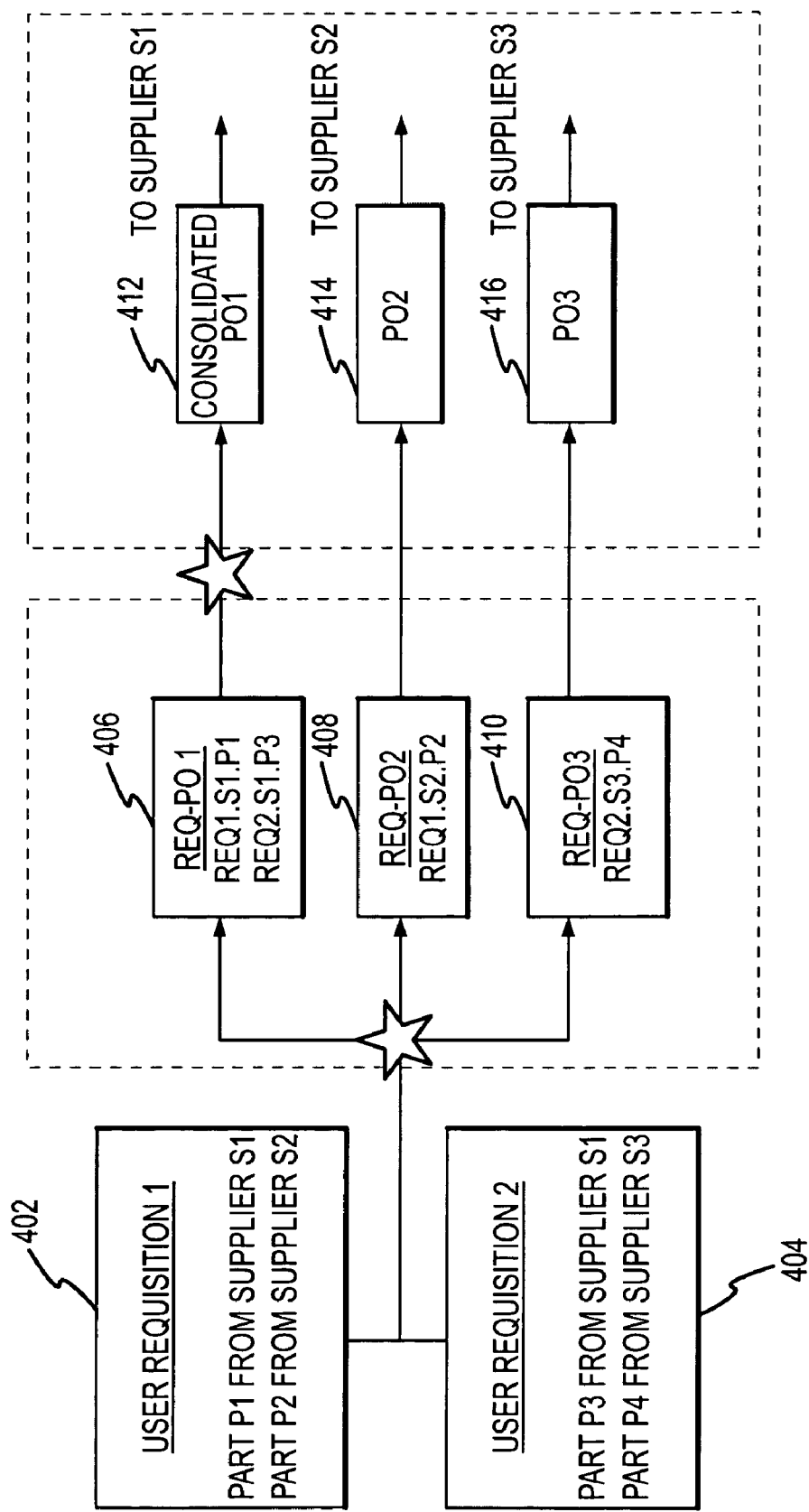
FIG. 4 is a conceptual diagram illustrating the consolidation and segregation of purchase orders according to one embodiment of the invention.

FIG. 4 schematically illustrates one method for consolidating purchase requests using a consolidation criterion. Shown in FIG. 4 are two requisitions 402 and 404. These requisitions may be of the type received at computer system 107. As shown, requisition 402 requests a part P1 from supplier S1 and a part P2 from supplier S2. Those skilled in the art will appreciate that any number of requisitions may be received having requests for one or more items from one or more suppliers; and that the example of FIG. 4 is provided merely to illustrate how consolidation may occur.

As requisitions are received at computer system 207, they are evaluated according to one or more consolidation criteria. This may be done on an item by item basis. Once a given criterion is met, consolidation begins. For example, the consolidation criterion may be to consolidate on Mondays at 1:00 p.m. Hence, as requisitions 402 and 404 are received, each line item may be flagged to indicate that it is to be consolidated on the next Monday. Once the next Monday is reached, computer system 107 evaluates which line items have been targeted for consolidation based on the initial analysis. In FIG. 4, both requisitions 402 and 404 meet the criterion, so consolidation begins. As part of the consolidation process, the qualifying line items are segregated into groups 406, 408 and 410 based on supplier. Once segregated, purchase orders 412, 414 and 416 are generated for each group. These may then be transmitted to each of the suppliers.

Hence, referring back now to FIG. 2, after the purchase order is created, the purchase order may be transmitted to the supplier as shown at block 222. This transmission may be over the Internet, via facsimile, by electronic mail, by an XML file, by an EDI, by the U.S. Postal Service, by express delivery and the like. If needed, interface 124 may be used to facilitate the transmission. Once the supplier receives the purchase order, the purchase order may be fulfilled by the supplier as shown in block 224.

Having described several embodiments, it will be recognized by those of skill in the art that various modifications, alternative constructions and equivalents may be used without departing from the spirit of the invention. Accordingly, the above description should not be taken as limiting the scope of the invention which is defined in the following claims.

What is claimed is:

1. A customer computer system for electronically ordering items from a plurality of suppliers, the customer computer system comprising a memory, a processor, a non-transitory computer readable medium and a network interface, wherein the network interface is coupled to a plurality of requester computers and a supervisor computer, the customer computer system is configured to:
   receive a first independent consolidation criterion and a second independent consolidation criterion from the supervisor computer, wherein:
      the first independent consolidation criterion defines consolidation criteria for a first supplier;
      the second independent consolidation criterion defines consolidation criteria for a second supplier;
      the first independent consolidation criterion is different from the second consolidation criterion; and
      the supervisor computer and the customer computer system are operated on behalf of a customer that orders supplies from the plurality of suppliers;
   receive a first request from a first requester computer to purchase a first plurality of items;
   receive a second request from a second requester computer to purchase a second plurality of items;
   trigger consolidation of the first request from the first requester computer to purchase the first plurality of items with the second request from the second requester computer to purchase the second plurality of items when the first triggering consolidation criterion is met, wherein the first triggering consolidation criterion is one of the one or more independent consolidation criteria;
   group qualifying items from the first plurality of items requested by the first requester computer and the second plurality of items requested by the second requester computer into a first qualified group and a second qualified group, wherein the qualifying items satisfy the triggering consolidation criterion;
   generate a first consolidated purchase order containing the first qualified group supplied by a first supplier of the plurality of suppliers;
   transmit the first consolidated purchase order to the first supplier;
   generate a second consolidated purchase order containing the second qualified group supplied by a second supplier of the plurality of suppliers; and
   transmit the second consolidated purchase order to the second supplier.

2. The system of claim 1 wherein the computer system comprises a server computer and an associated database, the database containing the independent consolidation criteria, the plurality of requests, and a list of suppliers.

3. A computer program product residing on a non-transitory processor-readable medium, the computer readable medium comprises processor readable instructions configured to cause a processor to:
   receive multiple independent consolidation criteria from a supervisor computer, wherein:
      the supervisor computer is separate from the plurality of requester computers;
      a first consolidation criterion of the multiple independent consolidation criteria for a first supplier is different from a second consolidation criterion of the multiple independent consolidation criteria for a second supplier; and
      the supervisor computer is operated on behalf of a customer that orders supplies from the plurality of suppliers;
   receive a first request from a first requester computer to purchase a first plurality of items;
   receive a second request from a second requester computer to purchase a second plurality of items;
   trigger consolidation of the plurality of requests when a triggering consolidation criterion is met, wherein the triggering consolidation criterion is one of the one or more independent consolidation criteria and the independent consolidation criteria are selected from a group consisting of hourly consolidation, daily consolidation, consolidation at a specified time, consolidation on specified days of the week, consolidation on specified dates, consolidation upon attainment of a specified monetary threshold, consolidation upon attainment of a specified minimum number of items, cost center consolidation, and consolidation upon attainment of a specified maximum number of items;
   group qualifying items from the one or more items, wherein the qualifying items satisfy the triggering consolidation criterion;
   generate a first consolidated purchase order containing the qualifying items supplied by a first supplier of the plurality of suppliers;
   transmit the first consolidated purchase order to the first supplier;
   generate a second consolidated purchase order containing the qualifying items supplied by a second supplier of the plurality of suppliers; and
   transmit the second consolidated purchase order to the second supplier.

4. A customer computer system for electronically ordering items from a plurality of suppliers, the customer computer system comprising a memory, a processor, a non-transitory computer readable medium and a network interface, wherein the network interface is coupled with a plurality of requester computers and a supervisor computer, the customer computer system is configured to:
   receive one or more independent consolidation criteria from the supervisor computer, wherein:
      the independent consolidation criteria are independent of supply commitments from the plurality of suppliers;
      the supervisor computer is separate from the requester computers;
      a first consolidation criterion of the independent consolidation criteria for a first supplier is different from a second consolidation criterion of the independent consolidation criteria for a second supplier; and
      the supervisor computer and the customer computer system are operated on behalf of a customer that orders supplies from the plurality of suppliers;
   receive a plurality of requests to purchase one or more items, wherein the requests are received from the plurality of requester computers;
   trigger consolidation of the plurality of requests when a triggering consolidation criterion is met, wherein the triggering consolidation criterion is one of the one or more independent consolidation criteria;

group qualifying items from the one or more items, wherein the qualifying items satisfy the triggering consolidation criteria;

generate a first consolidated purchase order containing the qualifying items supplied by a first supplier of the plurality of suppliers;

generate a second consolidated purchase order containing the qualifying items supplied by a second supplier of the plurality of suppliers;

transmit the first consolidated purchase order to the first supplier if the received approval information is affirmative; and transmit the second consolidated purchase order to the second supplier if the received approval information is affirmative.

5. A customer computer system for electronically ordering items from a plurality of suppliers, the customer computer system comprising a memory, a processor, a network interface, and a non-transitory computer readable medium, wherein the network interface is coupled to a plurality of requester computers, and a supervisor computer the customer computer system configured to:

transmit to the supervisor computer a form having data fields for entering consolidation information;

receive independent consolidation criteria from the supervisor computer, wherein:

the supervisor computer is separate from the plurality of requester computers;

a first consolidation criterion of the independent consolidation criteria for a first supplier is different from a second consolidation criterion of the independent consolidation criteria for a second supplier; and the supervisor computer and customer computer system are operated on behalf of a customer that orders supplies from the plurality of suppliers;

receive a plurality of requests to purchase one or more items, wherein the requests are received from the plurality of requester computers;

transmit a request for approval of at least a subset of the plurality of requests to the supervisor computer;

receive approval for at least a subset of the plurality of requests from the supervisor computer;

trigger consolidation of the subset of plurality of requests when a triggering consolidation criterion is met, wherein the triggering consolidation criterion is one of the one or more independent consolidation criteria;

group qualifying items from the one or more items, wherein the qualifying items satisfy the triggering consolidation criterion;

generate a first consolidated purchase order containing the qualifying items supplied by a first supplier of the plurality of suppliers;

transmit the first consolidated purchase order to the first supplier;

generate a second consolidated purchase order containing the qualifying items supplied by a second supplier of the plurality of suppliers; and transmit the second consolidated purchase order to the second supplier.

6. The system of claim 5, wherein the customer computer system comprises a server computer and an associated database.

7. The system of claim 1, wherein the triggering consolidation criterion is an hourly consolidation.

8. The system of claim 1, wherein the triggering consolidation criterion is a daily consolidation.

9. The system of claim 1, wherein the triggering consolidation criterion is consolidation on a specified date or day of the week.

10. The system of claim 1, wherein the triggering consolidation criterion is consolidation at a specified time.

11. The system of claim 1, wherein the triggering consolidation criterion is attainment of a specified minimum or maximum number of items.

12. The system of claim 1, wherein the triggering consolidation criterion is a cost center consolidation.

13. The system of claim 1, wherein the triggering consolidation criterion is attainment of a specified monetary threshold.

14. The system of claim 1, wherein the supervisor computer and the user computer are the same computer.

15. The system of claim 1, wherein at least one of the first request from the first requester computer and the second request from the second requester computer must be approved by a supervisor via the supervisor computer.

* * * * *